L. F. SLEEPER.
DETACHING APPARATUS FOR HORSES.

No. 188,427. Patented March 13, 1877.

Witnesses
Saml. J. Van Stavoren
J. B. Connolly

Louisa F. Sleeper, Inventor
By Connolly Bros., Attorneys

UNITED STATES PATENT OFFICE.

LOUISA F. SLEEPER, OF PHILADELPHIA, PENNSYLVANIA, ASSIGNOR OF ONE-HALF HER RIGHT TO CHARLES B. RITTER, OF SAME PLACE.

IMPROVEMENT IN DETACHING APPARATUS FOR HORSES.

Specification forming part of Letters Patent No. 188,427, dated March 13, 1877; application filed January 5, 1877.

*To all whom it may concern:*

Be it known that I, LOUISA F. SLEEPER, of Philadelphia, in the county of Philadelphia and State of Pennsylvania, have invented certain new and useful Improvements in Detaching Apparatus; and I do hereby declare the following to be a full, clear, and exact description of the invention, such as will enable others skilled in the art to which it pertains to make and use it, reference being had to the accompanying drawing, which forms part of this specification, in which—

Figure 1:
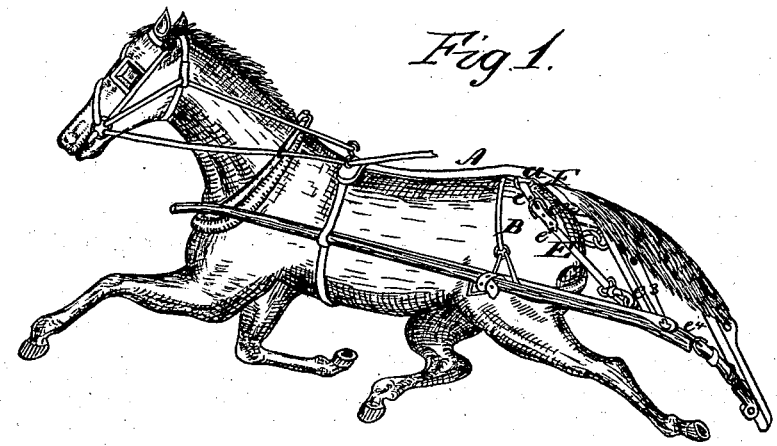
Figure 2:
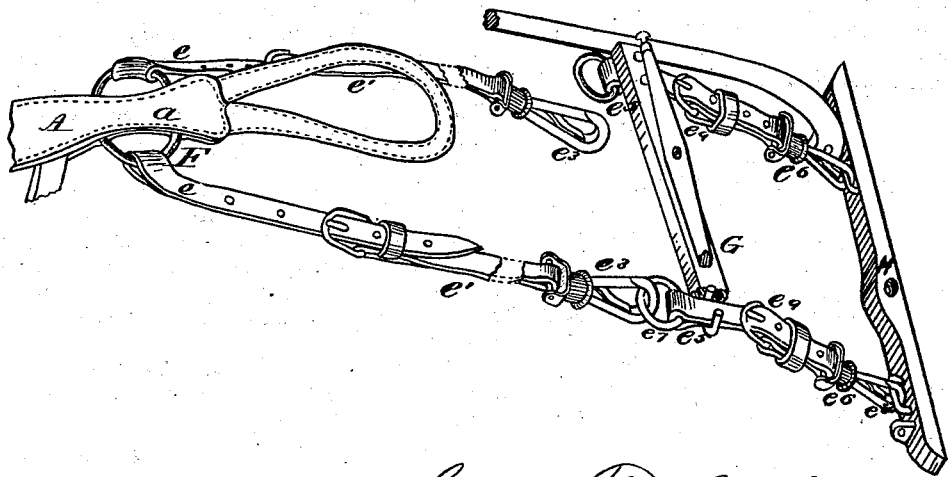

Figure 1 is a perspective representation of my invention applied to a horse. Fig. 2 is a perspective view of the device shown more in detail.

My invention has for its object to provide means for preventing injury to the legs of a runaway horse carrying off the shafts of a vehicle, which have been detached in order to insure the safety of the occupants of the latter.

My invention consists in the provision of straps for sustaining such detached shafts up and out of the way of possible contact with the horse's legs, said straps being connected to the back-strap of the harness, made in adjustable sections, provided with clips, and otherwise constructed and arranged, as hereinafter described and claimed.

Referring to the accompanying drawing, in which I have illustrated a horse running away and carrying the detached shafts of a vehicle with him, A is the back-strap; B, the hip-strap; C, the breech-band strap, of a set of harness, these parts being of the usual or any suitable construction, and not forming, in themselves, any part of my invention. E represents one of two like straps, secured to the back-strap at $a$ by any suitable means, and depending in such manner as to permit the same to be connected to the cross-bar of the shafts of a vehicle. Each of these straps I form in several sections, in order to facilitate their adjustment to horses of different sizes, and also to permit ready connection and disconnection in hitching and unhitching. $e$ represents the upper end section of one of said straps sewed to a ring, F, on the back-strap. $e^1$ is the next section, buckling onto $e$ at $e^2$, (where the adjustment is secured,) and terminating in a spring-clip, $e^3$. $e^4$ represents the lower or rear section formed in two parts, $e^5$ $e^6$, which buckle together at $e^9$, for adjusting purposes, and terminate, respectively in a ring, $e^7$, and spring-clip $e^8$. The part $e^5$ is designed to pass through a staple on the fixed cross-bar G of a pair of shafts, while the clip $e^8$ is designed to engage with another staple driven into the pivoted cross-bar H of said shafts.

In unhitching the clips, $e^3$ may be released from engagement with the rings $e^7$, leaving the sections $e^5$ secured to the shafts, or the entire straps may be detached from the shafts and carried off with the harness.

What I claim as my invention is—

The shaft-supporting straps E, made in sections $e$, $e^1$, and $e^4$, adjustable at $e^2$ and $e^9$, having spring-clips $e^3$ and $e^8$, and ring $e^7$, so as to facilitate adjustment and secure ready attachment to, and detachment from, the pivoted cross-bar H of the shafts of a vehicle, as set forth.

In testimony that I claim the foregoing I have hereunto set my hand this 12th day of December, 1876.

MRS. LOUISA F. SLEEPER.

Witnesses:
 M. DANL. CONNOLLY,
 CHAS. F. VAN HORN.